(12) United States Patent  
Chen et al.

(10) Patent No.: US 8,023,079 B2
(45) Date of Patent: Sep. 20, 2011

(54) LIQUID CRYSTAL DISPLAY (75) Inventors: Wei-Chou Chen, Hsinchu (TW); Kei-Hsiung Yang, Taoyuan (TW)

(73) Assignee: HannStar Display Corporation, Tao-Yuan Hsien (TW)

( * ) Notice: Subject to any disclaimer, the term of this patent is extended or adjusted under 35 U.S.C. 154(b) by 734 days.

(21) Appl. No.: 11/731,343

(22) Filed: Mar. 29, 2007

(65) Prior Publication Data

US 2008/0036926 A1 Feb. 14, 2008

Related U.S. Application Data (63) Continuation-in-part of application No. 11/028,109, filed on Jan. 3, 2005, now abandoned.

(30) Foreign Application Priority Data

Sep. 22, 2004 (TW) ................................ 93128770 A (51) Int. Cl.
 G02F 1/13 (2006.01)
 G02F 1/1335 (2006.01)
 C09K 19/02 (2006.01)

(52) U.S. Cl. ............................ 349/115; 349/1; 349/176
(58) Field of Classification Search ............... 349/1, 115, 349/176
See application file for complete search history.

(56) References Cited

U.S. PATENT DOCUMENTS

| 5,790,216 A * | 8/1998 | Inbar et al. ...................... 349/83 |
| 6,259,490 B1 | 7/2001 | Colgan et al. |
| 6,727,967 B2 * | 4/2004 | Nakamura et al. ............ 349/114 |
| 6,753,044 B2 | 6/2004 | Faris et al. |
| 6,812,980 B2 | 11/2004 | Karman |
| 2002/0154250 A1 | 10/2002 | An |
| 2006/0119768 A1 * | 6/2006 | Ito ................................. 349/106 |

* cited by examiner

*Primary Examiner* — Nathanael R Briggs
(74) *Attorney, Agent, or Firm* — Volpe and Koenig, P.C.

(57) ABSTRACT

The present invention provides a touch panel and a liquid crystal display. The liquid crystal display includes a panel, a plurality of reflective coding patterns printed on the panel, and a polarizing plate positioned on the panel, wherein the reflective coding patterns include a plurality of cholesteric liquid crystal molecules having a pitch length and a index of refraction, and the pitch length multiplied by the index of refraction is within a range of an infrared ray wavelength.

9 Claims, 6 Drawing Sheets

LIQUID CRYSTAL DISPLAY

CROSS REFERENCE TO RELATED APPLICATION

This application is a continuation-in-part of U.S. patent application Ser. No. 11/028,109, filed Jan. 3, 2005, which is incorporated by reference as if fully set forth.

FIELD OF INVENTION

This invention relates to a panel and a liquid crystal display, and more particularly to a touch panel and a touch liquid crystal display.

BACKGROUND

Currently, the touch input devices are widely used. According to the conventional touch input technologies, the touch input devices include sensors based on a resistance and sensors based on a capacitance, i.e. the touched position on the touch input device is identified by measuring the electrical potential changes via a circuit. Recently, the optical touch input technology is developed, the touched position is identified by identifying the optical images. For the optical touch input device, the information can be entered by writing on a specific coding arrangement via a light pen, wherein the specific coding arrangement is fabricated on the substrate of the optical touch input device. The coding arrangement is exposed to the light emitted from the light pen, and then the light is reflected to the image-detecting system. Then, the coding is obtained by identifying the detected images, so that the optical touch input is effected.

The cholesteric liquid crystal has a structure similar to the cholesterol molecule. It has spirally oriented stick-like molecules. As like the "nematic liquid crystals" with chiral characteristic. The molecules in the different layers of the cholesteric liquid crystal orient at a slight angle relative to each other, so that the cholesteric liquid crystal has a spiral structure.

Due to the optical activity and the spiral structure of the cholesteric liquid crystals, the light become the right-circularly polarized wave or the left-circularly polarized wave when reflected from the cholesteric liquid crystals. The 50% of the light with the optical activity identical to that of the cholesteric liquid crystals is reflected. The wavelength of the reflected light is equal to the average index of refraction of the cholesteric liquid crystals multiplied by the pitch length of the cholesteric liquid crystals. Accordingly, the cholesteric liquid crystals are widely used duo to the high index of refraction thereof. For example, U.S. Pat. No. 6,753,044 B2 discloses a coloring media including cholesteric liquid crystal flakes has the improved reflection characteristics of the red, green and blue colors.

Up to now, the brightness, contrast, the reaction time and the cost of the liquid crystal display stilled should be improved. The U.S. Pat. No. 6,727,967 B2 discloses a half-transmission color liquid crystal display, wherein a phase retardation plate and a liquid-crystal layer are provided between a polarizing plate and a cholesteric liquid crystal layer. In the U.S. Pat. No. 6,727,967B2, when the liquid crystal display device functions as a reflective liquid crystal display, light entering through the polarizing plate is reflected by the cholesteric liquid crystal layer; however, when the liquid crystal display device functions as a transmission liquid crystal display, light from the backlight passes through the cholesteric liquid crystal layer, and thereby the brightness and the color density of the liquid crystal display device are improved.

The present invention provides a liquid crystal panel with reflective coding patterns and a liquid crystal display with reflective coding patterns, wherein the optical touch input technology and the cholesteric liquid crystals are integrated into a panel or a display to be a touch input apparatus.

SUMMARY

It is an aspect of the present invention to provide a liquid crystal display with reflective coding patterns, which is formed by integrating the optical touch input technology and has optical characteristics of the cholesteric liquid crystals. The liquid crystal display with reflective coding patterns includes a panel, a reflective coding patterns printed on the panel, and a polarizing plate can be positioned under or above the reflective coding patterns, moreover the reflective coding patterns can be integrated into the polarizing plate wherein the reflective coding patterns comprise a plurality of cholesteric liquid crystal molecules having a pitch length and a index of refraction, and the pitch length multiplied by the index of refraction is within a range of an infrared ray wavelength.

Preferably, the reflective coding patterns are encoded by a coding system.

Preferably, the coding system is one selected from a group consisting of a hexagonal dot-coding system, a 2-dimensional bar coding system, and a 3-dimensional bar coding system Preferably, the coding patterns comprise cholesteric liquid crystal molecules can be printed on panel directly, and solidified by UV light.

In accordance with the present invention, the reflective coding layer is printed on the panel by one selected from a group consisting of an inkjet printing, a screen printing and a relief printing.

Preferably, the coding patterns comprise a plurality of micro-capsules can be printed on panel via a medium. Each micro-capsules at least contained one fixed pitch of cholesteric liquid crystal. And the micro-capsules can be dispersed in the coding patterns by the medium. The medium is one of an ink, a paint and a volatile solvent.

Preferably, the infrared ray wavelength is ranged from 700 nm to 1700 nm.

Preferably, the infrared ray wavelength is 910 nm.

It is another aspect of the present invention to provide a touch panel with a plurality of reflective coding patterns, and an input apparatus with infrared emitting and detecting device connected to a decoding system, which is formed by integrating the optical touch input technology and has optical characteristics of the cholesteric liquid crystals. The touch panel includes a plurality of reflective coding patterns printed on a panel, wherein the reflective coding patterns comprise a plurality of cholesteric liquid crystal molecules or micro-capsules formed by cholesteric liquid crystal molecules having a pitch length and a index of refraction, and the pitch length multiplied by the index of refraction is within a range of an infrared ray wavelength.

Preferably, the reflective coding patterns are encoded by a coding system.

Preferably, the coding system is selected from a group consisting of a hexagonal dot-coding system, a 2-dimensional bar coding system, and a 3-dimensional bar coding system.

Preferably, the reflective coding patterns are formed by a printing method.

Preferably, the printing method is one selected from a group consisting of an inkjet printing, a screen-printing and a relief printing.

Preferably, the reflective coding patterns comprises a medium and a plurality of micro-capsules evenly dispersed in the medium.

Preferably, the cholesteric liquid crystal molecules are dispersed in the micro-capsules.

Preferably, the medium is selected from a group consisting of a volatile solvent, an ink, and a paint.

Preferably, the infrared ray wavelength is ranged from 910 nm to 940 nm.

The above aspects and advantages of the present invention will become more readily apparent to those ordinarily skilled in the art after reviewing the following detailed description and accompanying drawings, in which:

DETAILED DESCRIPTION OF THE PREFERRED EMBODIMENTS

The invention is described more specifically with reference to the following embodiments. It is to be noted that the following descriptions of preferred embodiments of this invention are presented herein for the purpose of illustration and description only; it is not intended to be exhaustive or to be limited to the precise form disclosed.

Figure 1:
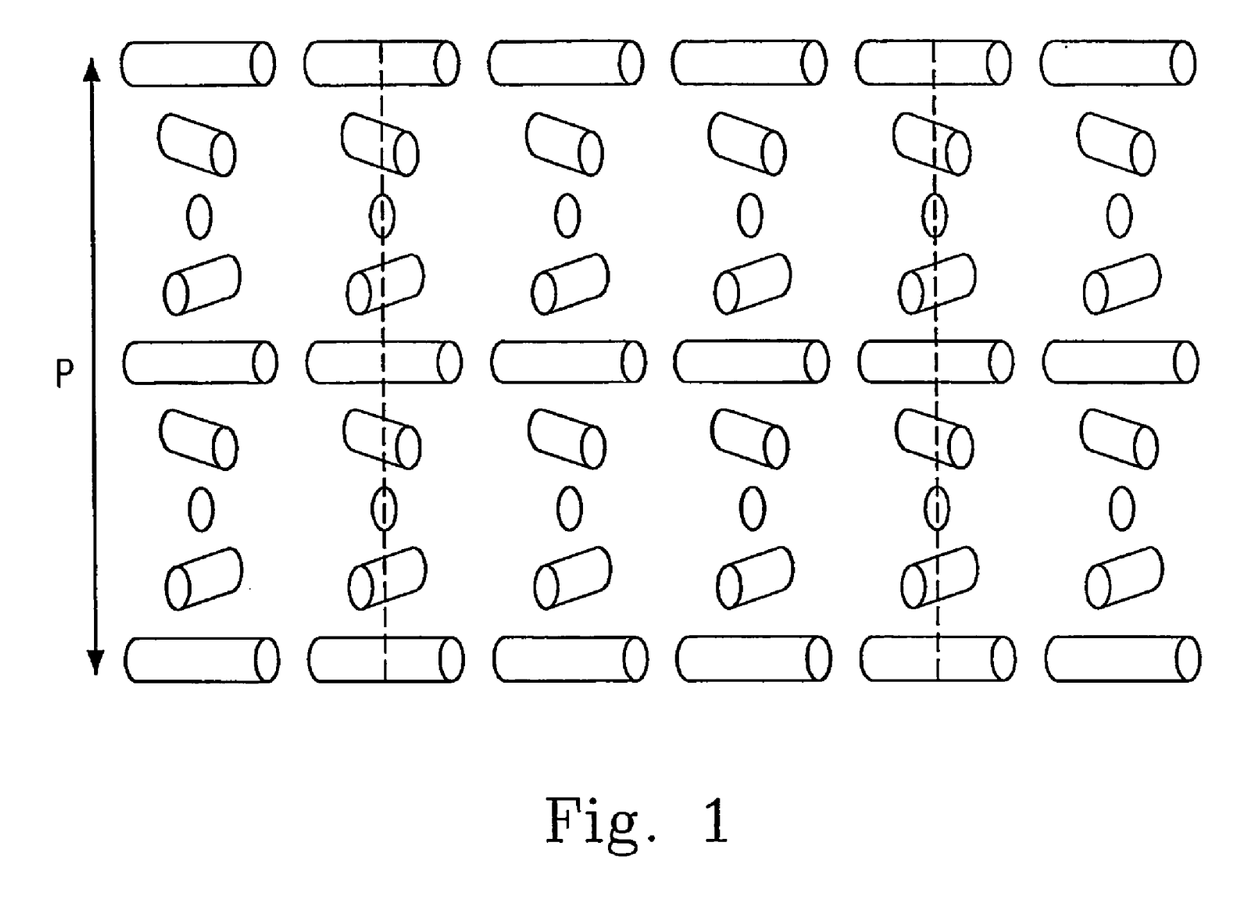
FIG. 1 is a schematic view illustrating the characteristic of the liquid crystal molecules.

Please refer to FIG. 1, which is a schematic view illustrating the characteristic of the liquid crystal molecules. The important characteristic of the cholesteric liquid crystal molecule is the pitch thereof. The pitch, "p", is defined as the distance it takes for the director to rotate one full turn in the helix as illustrated in the above animation. A byproduct of the helical structure of the chiral nematic phase, is its ability to selectively reflect light of wavelength "λ" when the wavelength "λ" of the reflected light is equal to the average index of refraction "n" of the cholesteric liquid crystal molecules multiplied by the pitch length "p" of the cholesteric liquid crystals.

The cholesteric liquid crystal molecules can be modified the pitch length resulting in an alteration of the wavelength of reflected light according to the temperature. Increasing the temperature of the cholesteric liquid crystal molecules, tightening the pitch, hence giving cholesteric liquid crystal molecules more thermal energy. Similarly, decreasing the temperature of the cholesteric liquid crystal molecules increases the pitch length, hence giving cholesteric liquid crystal molecules less thermal energy. This makes it possible to build a large wavelength range of reflected light by treated cholesteric liquid crystal molecules in the different temperature.

Therefore, cholesteric liquid crystal molecules can be modified in selective pitch length by treated in selective temperature, hence, it can selectively reflect certain wavelength of light but not absorbing it. And, the cholesteric liquid crystal molecules can also be fabricated and solidified by treated in energetic irradiation such as UV (UV-A or UV-B) irradiation. Via energetic irradiation, the cholesteric liquid crystal molecules are solidified into a film of liquid crystal polymer, hence the cholesteric liquid crystal can be fixed on the liquid crystal panel surface.

Figure 2:
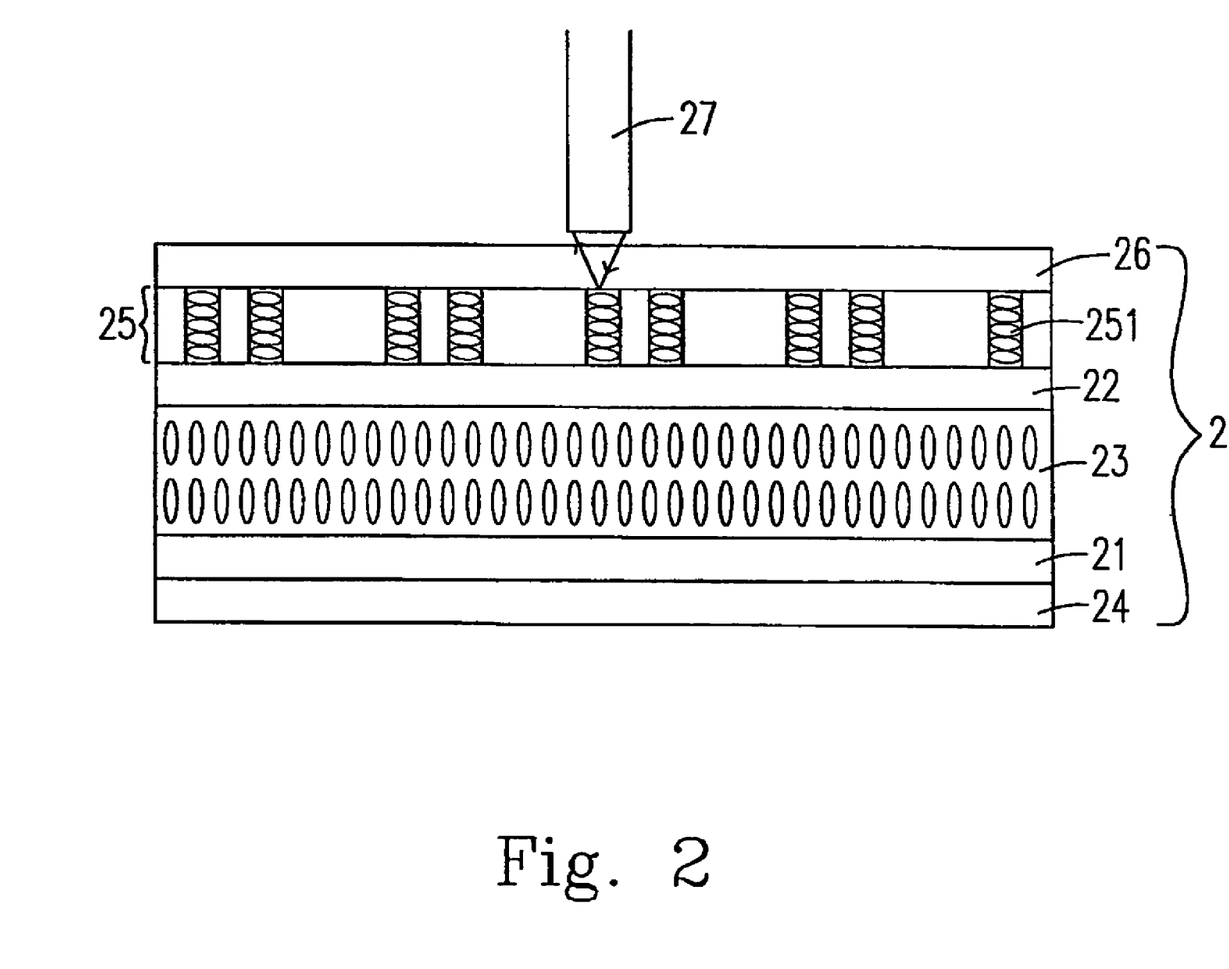
FIG. 2 is a schematic view illustrating the liquid crystal display with reflective coding patterns according to the first embodiment of the present invention.

Please refer to FIG. 2, which is a schematic view illustrating the liquid crystal display with reflective coding patterns according to the first embodiment of the present invention.

The liquid crystal display 21 with reflective coding patterns 25 include a first substrate 21, a second substrate 22, a liquid crystal layer 23 disposed between the first substrate 21 and the second substrate 22, a first polarizing plate 24 disposed under the first substrate 21, a reflective coding patterns 25 disposed above the second substrate 22, a second polarizing plate 26 disposed on the reflective coding patterns 25, and a light pen 27 connected to the liquid crystal panel 2.

In accordance with the first embodiment, the reflective coding patterns 25 can be printed with cholesteric liquid crystal molecules 251 on the liquid crystal panel 2 directly. According to the characteristic of cholesteric liquid crystal molecules 251, the cholesteric liquid crystal molecules 251 can be modified in selective pitch length by treated in selective temperature. Furthermore the cholesteric liquid crystal molecules 251 can be solidified by treated in energetic irradiation such as UV (UV-A or UV-B) irradiation. Via energetic irradiation, the cholesteric liquid crystal molecules 251 are solidified into a film of liquid crystal polymer, hence the cholesteric liquid crystal molecules 251 can be fixed on the liquid crystal panel surface. And the reflective coding patterns 25 can be printed by inkjet printing, screen printing or relief printing. In accordance with the present invention, the pitch length multiplied by the index of refraction is within a range of an infrared ray wavelength (700 nm-300 k nm). Preferably, the pitch length multiplied by the index of refraction is ranged from 800 nm to 1700 nm. More preferably, the pitch length multiplied by the index of refraction is 910 nm. It means that the infrared ray with the wavelength of 910 nm can be reflected by the liquid crystal display 1 with reflective coding patterns 25.

Figure 3:
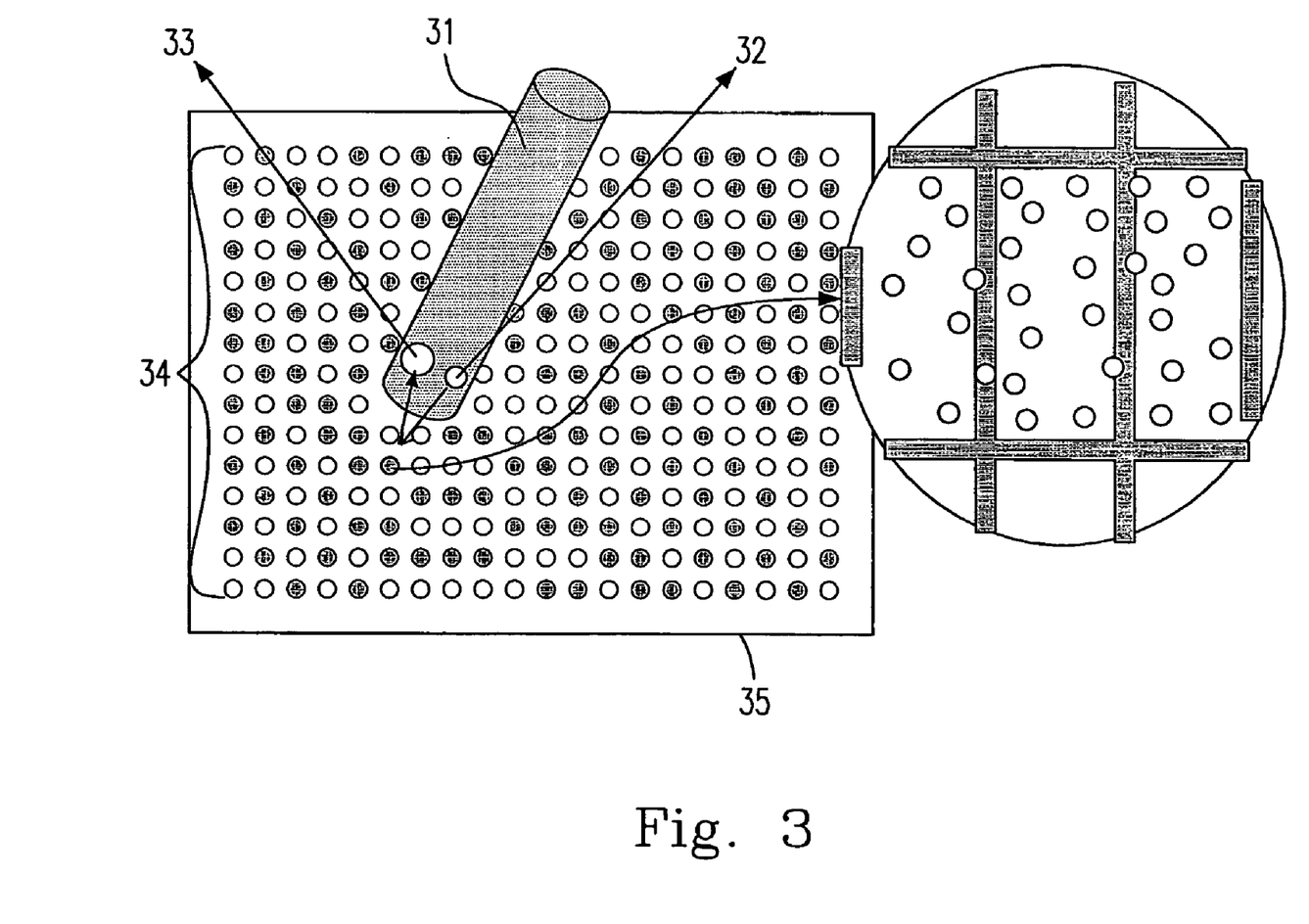
FIG. 3 is a schematic view illustrating of how a light pen detecting the pattern encode on the liquid crystal display according to the first embodiment of the present invention.

Please refer to FIG. 3, which is a schematic view illustrating of how a light pen detecting the pattern encode on the liquid crystal display according to the first embodiment of the present invention. According to the first embodiment, a light pen 31 has an infrared ray emitting device 32 and an infrared ray detecting device 33. Since the infrared ray with the wavelength from 910 nm to 940 nm can be reflected by the reflective coding patterns 34, a light pen 31 can be applied to the liquid crystal display 35 with reflective coding patterns 34 for emitting the infrared ray and detecting the images, wherein the light emitted from the light pen 31 to the reflective coding patterns 34 is reflected to the image detecting device 33, and then according to the different brightness among the reflected infrared rays, the image is detected and identified, so that the position data having such coded is obtained. Certainly, the reflective coding patterns 34 on liquid crystal display 35 with a light pen 31 function as an optical touch input apparatus. It is advantageous to avoid the visible light absorbed by the coded patterns, influencing the brightness of the display. Furthermore, the liquid crystal display 35 with reflective coding patterns 34 has the cholesteric liquid crystal molecules with the high reflection, so that the liquid crystal display 35 with reflective coding patterns 34 has not only the great effects on providing the light source with great reflectivity and power-saving, but also high brightness.

Figure 4:
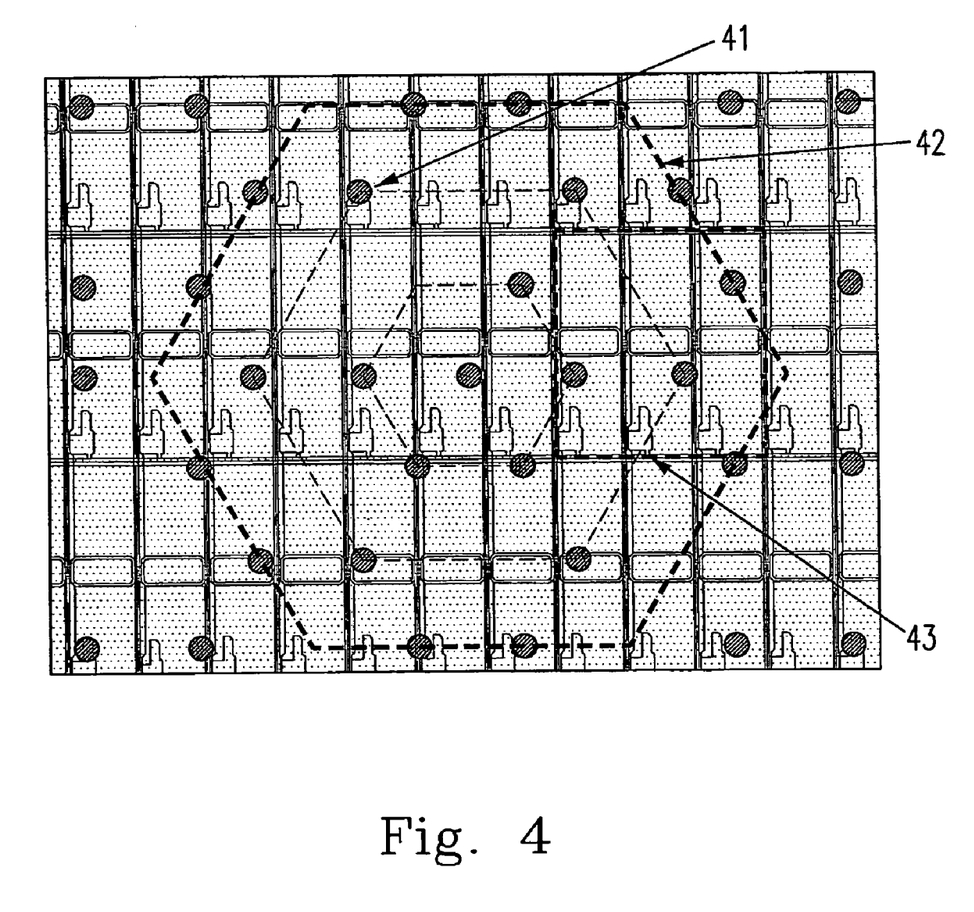
FIG. 4 is a schematic view illustrating the hexagonal dot-coded system according to the first embodiment of the present invention.

According to the first embodiment, the cholesteric liquid crystal reflective coding patterns on liquid crystal display can be encoded by a coding system. The coding system is selected from a group consisting of a hexagonal dot-coding system, two-dimension barcode system, three-dimension barcode system or any other coding systems can be used in these coding patterns. Please refer to FIG. 4, which is a schematic view illustrating the hexagonal dot-coded system according to the first embodiment of the present invention. The cholesteric liquid crystal molecules are formed on the panel as a coding area 41, which are arrayed in hexagons. Three concentric hexagons are recognized as one pattern unit 42 that larger than a pixel 43, and each pattern unit 42 has a different reflecting pattern.

Further, these cholesteric liquid crystal coding patterns on liquid crystal display can also encode several kinds of data, i.e. the coordinate data, system data or any other data. Therefore, when using a light pen with infrared ray emitting device touches the liquid crystal display with reflective coding patterns, the coded data in the patterns can be identified by the detecting device in the light pen, so that the optical touch input is effected.

According to the first embodiment, the light pen 31 having an infrared emitting device 32 and an infrared detecting device 33 and communicated with the liquid crystal display panel 35. Therefore, the light pen 31 connects to the liquid crystal panel 35 by wire. Furthermore, the light pen 31 can connects to the liquid crystal panel 35 by wireless for more convenient operation, hence, the wireless module can be installed into the light pen 31 and the liquid crystal display panel 35 for data communication.

According to the first embodiment of the present invention, the cholesteric liquid crystal reflective coding patterns 25 on liquid crystal panel 2 can disposed above the second polarizing plate 26, also can disposed between the second polarizing plate 26 and the second substrate 22. Furthermore, the cholesteric liquid crystal reflective coding patterns 25 also can be integrated into the second polarizing plate 26.

Figure 5:
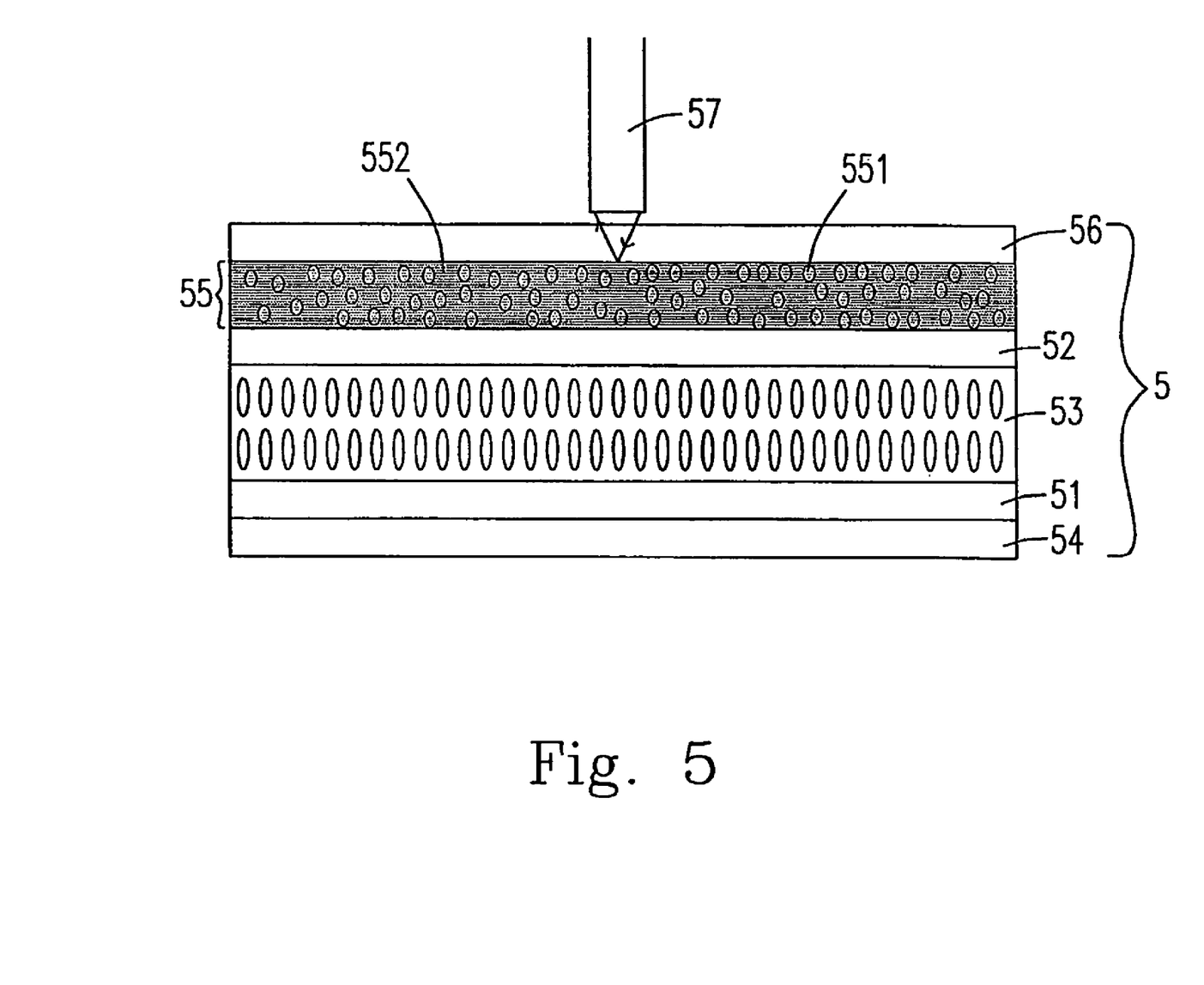
FIG. 5 is a schematic view illustrating the liquid crystal display with reflective coding patterns according to the second embodiment of the present invention.

Please refer to FIG. 5, which is a schematic view illustrating the liquid crystal display with reflective coding patterns according to the second embodiment of the present invention.

The liquid crystal display 5 with reflective coding patterns 55 includes a first substrate 51, a second substrate 52, a liquid crystal layer 53 disposed between the first substrate 51 and the second substrate 52, a first polarizing plate 54 disposed under the first substrate 51, a reflective coding patterns 55 disposed above the second substrate 52, a second polarizing plate 56 disposed on the reflective coding patterns 55, and a light pen 57 connected to the liquid crystal display 5.

Figure 6:
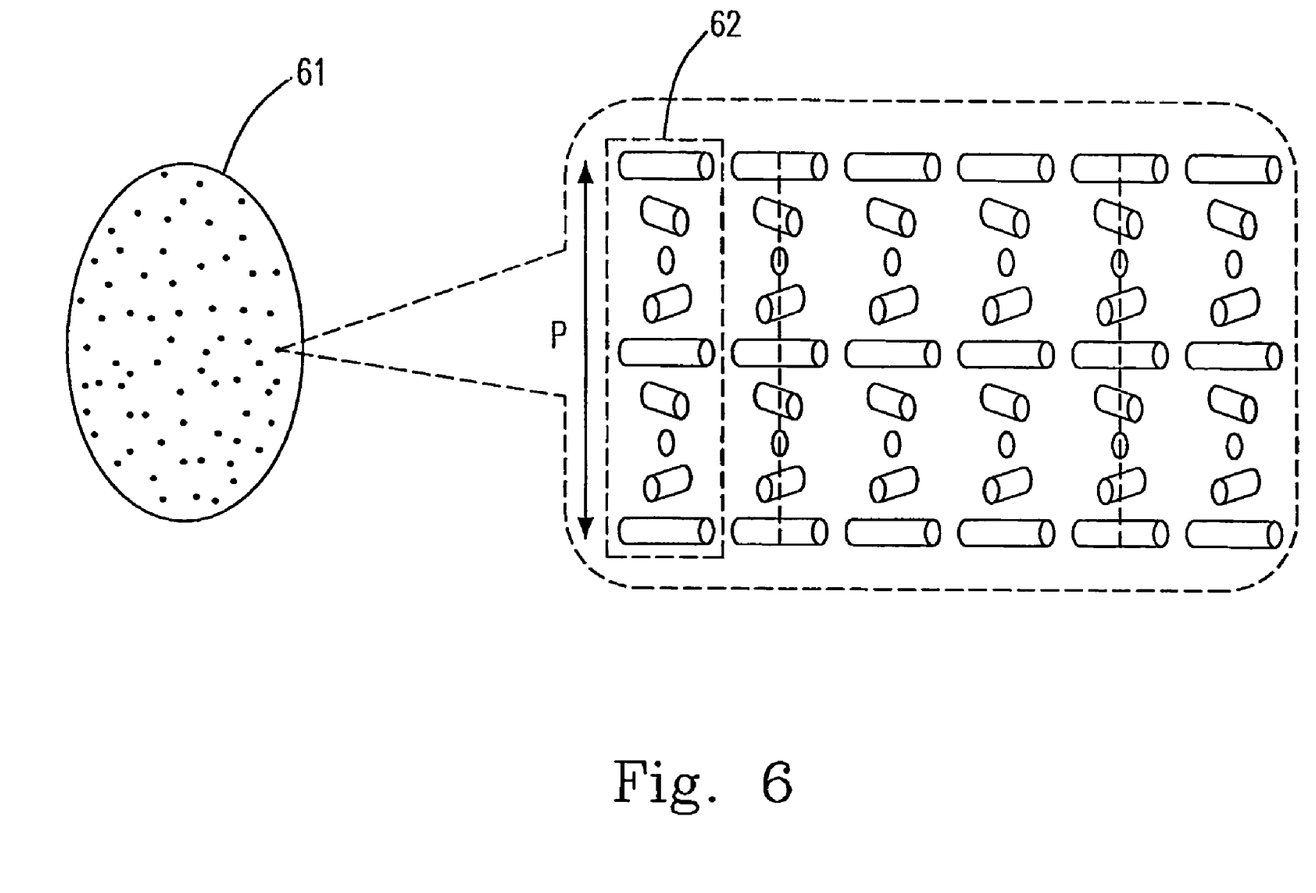
FIG. 6 is a schematic view illustrating the structure of the micro-capsule according to the second embodiment of the present invention.

According to the second embodiment, the reflective coding patterns 55 can printed with a medium 552 and a plurality of micro-capsules 551 on the liquid crystal display 5. As showed in FIG. 6, which is a schematic view illustrating the structure of the micro-capsule according to the second embodiment of the present invention, the micro-capsules 61 include a plurality of cholesteric liquid crystal molecules 62 that have identical pitch length (p),which can be made in advance. In the prior procedures, the pitch length (p) of the cholesteric liquid crystal molecules 62 are regulated through the temperature control. After regulating the pitch length by the specific temperature, the cholesteric liquid crystal molecules 62 need to be irradiated by UV((UV-A or UV-B) to fix the pitch length and solidified into a film of liquid crystal polymer, which fixes the cholesteric liquid crystal molecules 62 on the liquid crystal display surface. As to the micro-capsules 61', they are made in the same procedure but fragmented into the uniform micro-capsules 61 in the following step. As showed in FIG. 5, the micro-capsules 551 can be mixed with a medium 552, and printed on the liquid crystal display 5 in a specific pattern. The medium 552 can be an ink, a paint or a volatile solvent for the micro-capsules 551 being evenly dispersed in a medium 552. And the reflective coding patterns 55 can be printed by inkjet printing, screen printing or relief printing. The micro-capsules 551 with a plurality of cholesteric liquid crystal molecules 62 inside have a pitch length (p) and an average index of refraction. In accordance with the present invention, the pitch length multiplied by the average index of refraction is within a range of an infrared ray wavelength (700 nm-300 k nm). Preferably, the pitch length multiplied by the average index of refraction is ranged from 700 nm to 1700 nm. More preferably, the pitch length multiplied by the average index of refraction is ranged from 910 nm to 940 nm. It means that the infrared ray with the wavelength from 910 nm to 940 nm can be reflected by the reflecting coded liquid crystal display. In addition, the reflective coding patterns also could be a material for reflecting the infrared ray but passing the visible light passing through. For example, the material can be SDA7775, SDA7779, SDA4850 or SDA8737 (H. W. Sand Corp.).

The function and operation of the second embodiment similar to the first embodiment. In the second embodiment, the reflective coding patterns 55 with a plurality of micro-capsules 551 printed on the liquid crystal display 5. Since the infrared ray with the wavelength from 910 nm to 940 nm can be reflected by the reflective coding patterns 55 with a plurality of micro-capsules 551, a light pen 57 having an infrared emitting device and an infrared detecting device and communicated with the liquid crystal display panel can be applied to the liquid crystal display with reflective coding patterns 55 for emitting the infrared ray and detecting the images, wherein the light emitted from the light pen 57 to the reflective coding patterns 55 is reflected to the image detection system, and then according to the different brightness among the reflected infrared rays, the image is detected and identified, so that the position data having such coded is obtained. Therefore, when using a light pen 57 with infrared ray emitting device touches the liquid crystal display 5 with reflective coding patterns 55, the coded data in the patterns can be identified by the detecting device in the light pen 57, so that the optical touch input is effected.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:
1. A liquid crystal display, comprising:
  a liquid crystal display panel including a first substrate and a second substrate;
  a liquid crystal layer disposed between the first substrate and the second substrate;
  a first polarizing plate positioned under the first substrate;
  a second polarizing plate positioned on the second substrate; and
  a plurality of reflective coding patterns disposed in a position selected from a group consisting of above the sec- ond polarizing plate, between the second polarizing plate and the second substrate, and integrated into the second polarizing plate;

wherein the reflective coding patterns include a plurality of cholesteric liquid crystal molecules, and the cholesteric liquid crystal molecules are used to provide an encoded data for a light pen to detect the encoded data from the corresponding cholesteric liquid crystal molecules, wherein said reflective coding patterns are encoded by a coding system including one selected from a group consisting of a hexagonal dot-coding system, a 2-dimensional bar coding system, and a 3-dimensional bar coding system.

2. The liquid crystal display according to claim 1, wherein the plurality of cholesteric liquid crystal molecules have a pitch length and an index of refraction, and a product of the pitch length and the index of refraction is within a range of an infrared ray wavelength.

3. The liquid crystal display according to claim 2, wherein the infrared ray wavelength is ranged from 700 nm to 1700 nm.

4. The liquid crystal display according to claim 1, wherein the polarizing plate is positioned between the liquid crystal display panel and the reflective coding patterns.

5. The liquid crystal display according to claim 1, wherein the reflective coding patterns are formed by a printing method.

6. The liquid crystal display according to claim 5, wherein the printing method is selected from a group consisting of an inkjet printing, a screen-printing and a relief printing.

7. The liquid crystal display according to claim 1, wherein the reflective coding patterns comprise a medium and a plurality of micro-capsules evenly dispersed in the medium.

8. The liquid crystal display according to claim 7, wherein the cholesteric liquid crystal molecules are dispersed in the micro-capsules.

9. The liquid crystal display according to claim 7, wherein the medium is selected from a group consisting of a volatile solvent, an ink, and a paint.

* * * * *